US011984078B2

(12) United States Patent
Koo

(10) Patent No.: US 11,984,078 B2
(45) Date of Patent: May 14, 2024

(54) IMAGE DISPLAY DEVICE AND SYSTEM COMPRISING SAME

(71) Applicant: LG ELECTRONICS INC., Seoul (KR)

(72) Inventor: Sunbon Koo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/017,495

(22) PCT Filed: Jul. 27, 2020

(86) PCT No.: PCT/KR2020/009875
§ 371 (c)(1),
(2) Date: Jan. 23, 2023

(87) PCT Pub. No.: WO2022/025304
PCT Pub. Date: Feb. 3, 2022

(65) Prior Publication Data

US 2023/0274697 A1 Aug. 31, 2023

(51) Int. Cl.
*G09G 3/3233* (2016.01)

(52) U.S. Cl.
CPC ... *G09G 3/3233* (2013.01); *G09G 2320/0257* (2013.01); *G09G 2320/043* (2013.01)

(58) Field of Classification Search
CPC ......... G09G 3/3233; G09G 2320/0257; G09G 2320/043; G09G 2320/0233;
(Continued)

(56) References Cited

U.S. PATENT DOCUMENTS 6,271,825 B1 * 8/2001 Greene .................... H04N 9/12
345/694
8,610,739 B2 * 12/2013 Lonkar .................. G06K 15/02
345/589

(Continued)

FOREIGN PATENT DOCUMENTS

KR 10-2006-0016275 A 2/2006
KR 10-2013-0002115 A 1/2013

(Continued)

*Primary Examiner* — Michael J Jansen, II
(74) *Attorney, Agent, or Firm* — Birch, Stewart, Kolasch & Birch, LLP

(57) ABSTRACT

A system including a plurality of image display apparatuses including at least a first image display apparatus and a second image display apparatus, and a control device controlling the first image display apparatus and the second image display apparatus. The control device controls the first image display apparatus to display a first image, controls the second image display apparatus to display a second image, controls the first image display apparatus to perform an afterimage compensation for pixels included in a first display panel in the first image display apparatus, receives data results of the afterimage compensation for pixels included in the first display panel from the first image display apparatus, and controls the second image display apparatus to perform an afterimage compensation for pixels included in a second display panel in the second image display apparatus, based on the received data results of the afterimage compensation performed for the pixels included in the first display panel in the first image display apparatus.

17 Claims, 8 Drawing Sheets

(58) Field of Classification Search
CPC ..... G09G 2320/048; G09G 2320/0626; G09G 2354/00
See application file for complete search history.

(56) References Cited

U.S. PATENT DOCUMENTS

| | | | | |
|---|---|---|---|---|
| 8,730,257 | B2 * | 5/2014 | Kyriazis | G09G 5/39 345/545 |
| 9,715,853 | B2 * | 7/2017 | Kim | G09G 3/3258 |
| 10,649,711 | B2 * | 5/2020 | Wang | G06F 3/1423 |
| 11,221,815 | B2 * | 1/2022 | Shimizu | G09G 5/006 |
| 11,823,637 | B2 * | 11/2023 | Lin | G09G 3/3614 |
| 2005/0212824 | A1 * | 9/2005 | Marcinkiewicz | G09G 3/3406 345/690 |
| 2008/0049034 | A1 * | 2/2008 | Chin | G06F 3/1438 345/535 |
| 2011/0249015 | A1 * | 10/2011 | Lonkar | G09G 5/02 345/589 |
| 2012/0019546 | A1 * | 1/2012 | Kyriazis | G06F 3/1431 345/549 |
| 2016/0035073 | A1 | 2/2016 | Park | |
| 2016/0133202 | A1 * | 5/2016 | Saito | G09G 5/02 345/690 |
| 2016/0165229 | A1 * | 6/2016 | Kao | H04N 9/12 348/189 |
| 2017/0132977 | A1 * | 5/2017 | Kim | G09G 3/3291 |
| 2018/0267760 | A1 * | 9/2018 | Shimizu | G06F 3/1415 |
| 2018/0293042 | A1 * | 10/2018 | Wang | G06F 3/1423 |
| 2023/0206872 | A1 * | 6/2023 | Lin | G09G 3/3614 345/96 |

FOREIGN PATENT DOCUMENTS

| | | | |
|---|---|---|---|
| KR | 10-2019-0007662 | A | 1/2019 |
| KR | 10-2019-0119925 | A | 10/2019 |

* cited by examiner

IMAGE DISPLAY DEVICE AND SYSTEM COMPRISING SAME

CROSS REFERENCE TO RELATED APPLICATIONS

This application is the National Phase of PCT/KR2020/009875 filed on Jul. 27, 2020, which is hereby expressly incorporated by reference into the present application.

TECHNICAL FIELD

The present disclosure relates to an image display apparatus and a system including the same.

BACKGROUND ART

An image display apparatus has a function of displaying an image that a user can watch. Recently, as the demand for image display apparatuses has increased in various forms along with the development of the information society, various display devices such as Liquid Crystal Display Device (LCD), Plasma Display Panel (PDP), Electroluminescent Display (ELD), and Vacuum Fluorescent Display (VFD) have been researched and used.

Among them, an image display apparatus using an organic light emitting diode OLED has excellent luminance characteristics and viewing angle characteristics compared to an image display apparatus such as an LCD, and does not require a backlight unit. Accordingly, there is an advantage of being implemented in an ultra-thin type.

When an image display apparatus using an organic light emitting diode OLED, a driving element such as a thin film transistor TFT for controlling current flowing through the organic light emitting diode OLED is provided for each pixel of a display panel.

In general, it is preferable that the electrical characteristics of the driving elements are the same in all pixels, but the electrical characteristics of the driving elements may not be uniform due to process conditions, driving environments, etc., and the driving element and the organic light emitting diode OLED may be deteriorated depending on the use time and usage method of the image display apparatus. In this case, when the electrical characteristics of the driving elements are not uniform, or when the driving element or the organic light emitting diode OLED is deteriorated, the luminance of a partial area of the display panel may be non-uniform or an afterimage may occur.

Conventionally, in order to solve the problem of an afterimage occurring, a voltage or the like applied to each element included in the display panel is detected to check a degree of a change or deterioration in electrical characteristics of a driving element or organic light emitting diode OLED, thereby performing compensation for removing afterimages.

A conventional image display apparatus determines the state of a display panel according to a user input or a preset time interval, and performs an operation for compensating for afterimages. However, if such an operation is not periodically performed by a user or a preset time interval is long, there is a problem in that the possibility of occurrence of problems such as defective pixel or afterimage increases.

SUMMARY

The present disclosure has been made in view of the above problems, and provides an image display apparatus capable of utilizing the result of an operation for compensating an afterimage performed in one of a plurality of image display apparatuses, for an operation for compensating an afterimage performed in other image display apparatus, and a system including the same.

According to an embodiment of the present disclosure for achieving the above object, there is provided a system comprising a plurality of image display apparatuses and a control device, wherein the plurality of image display apparatuses output an image corresponding to an image signal received from the control device, respectively, wherein a first image display apparatus of the plurality of image display apparatuses performs afterimage compensation for a first display panel provided in the first image display apparatus, determines whether a result of performing the afterimage compensation satisfies a certain reference, and when a result of performing the afterimage compensation satisfies the certain reference, transmits a signal including data for the result of performing the afterimage compensation to the control device, wherein when the signal including data for the result of performing the afterimage compensation is received from the first image display apparatus, the control device transmits a control signal for instructing performance of the afterimage compensation to a second image display apparatus of the plurality of image display apparatuses, wherein when the control signal is received from the control device, the second image display apparatus performs afterimage compensation for a second display panel provided in the second image di splay apparatus.

According to an embodiment of the present disclosure, there is provided an image display apparatuses including: a display including a display panel; an external device interface unit configured to transmit and receive a signal to and from a control device; and a controller, wherein the controller outputs an image corresponding to an image signal received from the control device through the display, performs afterimage compensation for the display panel, determines whether a result of performing the afterimage compensation satisfies a certain reference, and transmits a signal including data for the result of performing the afterimage compensation to the control device through the external device interface unit, when the result of performing the afterimage compensation satisfies the certain reference.

According to an embodiment of the present disclosure, there is provided a control device including: an external device interface unit configured to transmit and receive a signal to and from a plurality of image display apparatuses; and a controller, wherein the controller transmits an image signal to the plurality of image display apparatuses through the external device interface unit, and when a signal including data for a result of performing afterimage compensation is received from a first image display apparatus among the plurality of image display apparatuses, transmits a control signal for instructing performance of the afterimage compensation to a second image display apparatus among the plurality of image di splay apparatuses.

Advantageous Effects

The effect of the display device according to the present disclosure will be described as follows.

According to at least one embodiment of the present disclosure, when a plurality of image display apparatuses output the same/similar images, as a result of performing an operation for compensating an afterimage by a first image display apparatus, if the degree of deterioration of the driving element or organic light emitting diode of the first image display apparatus exceeds a certain standard, a second image display apparatus may also start to perform an operation for compensating an afterimages according to a certain condition, even without a user input or a lapse of a preset time.

In addition, according to at least one embodiment of the present disclosure, the result of performing an operation for compensating an afterimage by the first image display apparatus is utilized for performing an operation for compensation for the afterimage performed in the second image display apparatus, thereby more accurately and quickly completing the compensation of afterimage by the second image display apparatus.

Further scope of applicability of the present disclosure will become apparent from the following detailed description. However, it should be understood that the detailed description and specific embodiments such as preferred embodiments of the present disclosure are given by way of example only, since various changes and modifications within the spirit and scope of the present disclosure may be clearly understood by those skilled in the art.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function. Accordingly, the "module" and "unit" may be used interchangeably.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

In addition, it will be understood that although the terms first, second, etc. may be used herein to describe various elements, these elements should not be limited by these terms. These terms are only used to distinguish one element from another.

Figure 1:
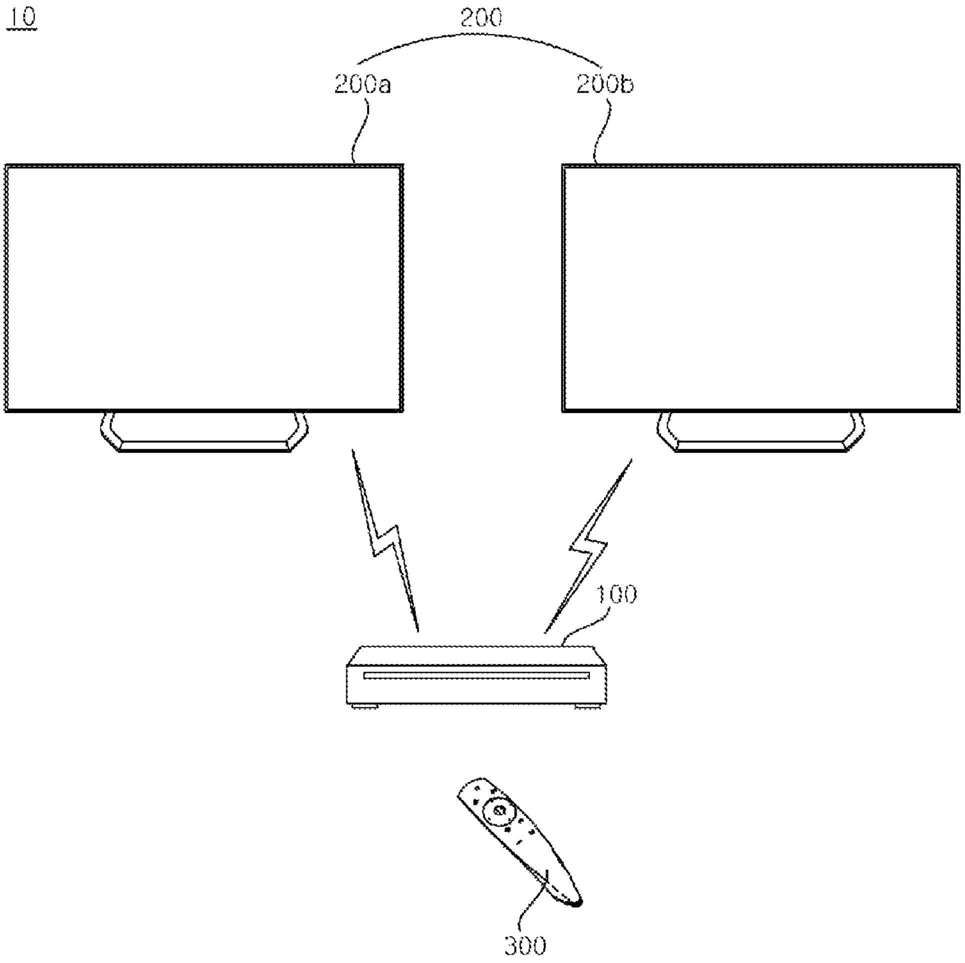
FIG. 1 is a diagram illustrating an image display system according to an embodiment of the present disclosure.

FIG. 1 is a diagram illustrating a system 10, according to various embodiments of the present disclosure. Referring to FIG. 1, the system 10 includes a control device 100, a plurality of image display apparatuses 200*a* and 200*b*, and/or a remote control device 400.

The control device 100 control a corresponding image display apparatus 200. For example, the control device 100 can transmit a control signal for controlling an operation of the image display apparatus 200 to the image display apparatus 200.

The control device 100 can also transmit an image signal and/or a voice signal to the image display apparatus 200. For example, the control device 100 can simultaneously transmit the same image signal and/or voice signal to the image display apparatuses 200*a* and 200*b*, and the image display apparatuses 200*a* and 200*b* can process the image signal and/or voice signal received from the control device 100, and output an image and/or a voice simultaneously.

The control device 100 can also receive a broadcast signal, signal-process the signal and transmit the signal-processed image signal and/or voice signal to at least one of the plurality of image display apparatuses 200*a* and 200*b*. The control device 100 can also receive a broadcasting signal wirelessly through an antenna, or receive a broadcasting signal by wire through a cable. For example, the control device 100 can receive a terrestrial broadcasting signal, a satellite broadcasting signal, a cable broadcasting signal, an Internet Protocol Television (IPTV) broadcasting signal, and the like.

The image display apparatus 200 is a device that processes and outputs an image. The image display apparatus 200 is not particularly limited as long as it can output a screen corresponding to an image signal, such as a TV, notebook computer, or monitor. For example, the image display apparatuses 200*a* and 200*b* can be a signage (or digital signage) that is installed outside a building, inside a building, in a station, etc. for the purposes of advertising, and that outputs various images corresponding to image signals received from the control device 100 in the same way.

Further, the remote control device 400 can be connected to the control device 100 by wire and/or wirelessly, and provide various control signals to the control device 100. The remote control device 400 includes a device that establishes a wired or wireless network with the control device 100 and through the established network, transmits various control signals to the control device 100 or receives signals related to various operations processed in the control device 100 from the control device 100.

For example, various input devices such as a mouse, a keyboard, a space remote control, a track ball, and a joystick can be used as the remote control device 400. In addition, the remote control device 400 may be referred to as an external device, and it should be noted that the external device and the remote control device may be used interchangeably if necessary.

Further, the control device 100 may be connected to only a single remote control device 400, or connected to two or more remote control devices 400 simultaneously, and can change an object displayed in the image display apparatus 200 or adjust the state of a screen, based on a control signal provided from each remote control device 400. The remote control device 400 can be connected to the image display apparatus 100 by wire and/or wirelessly to provide various control signals to the image display apparatus 100.

Figure 2:
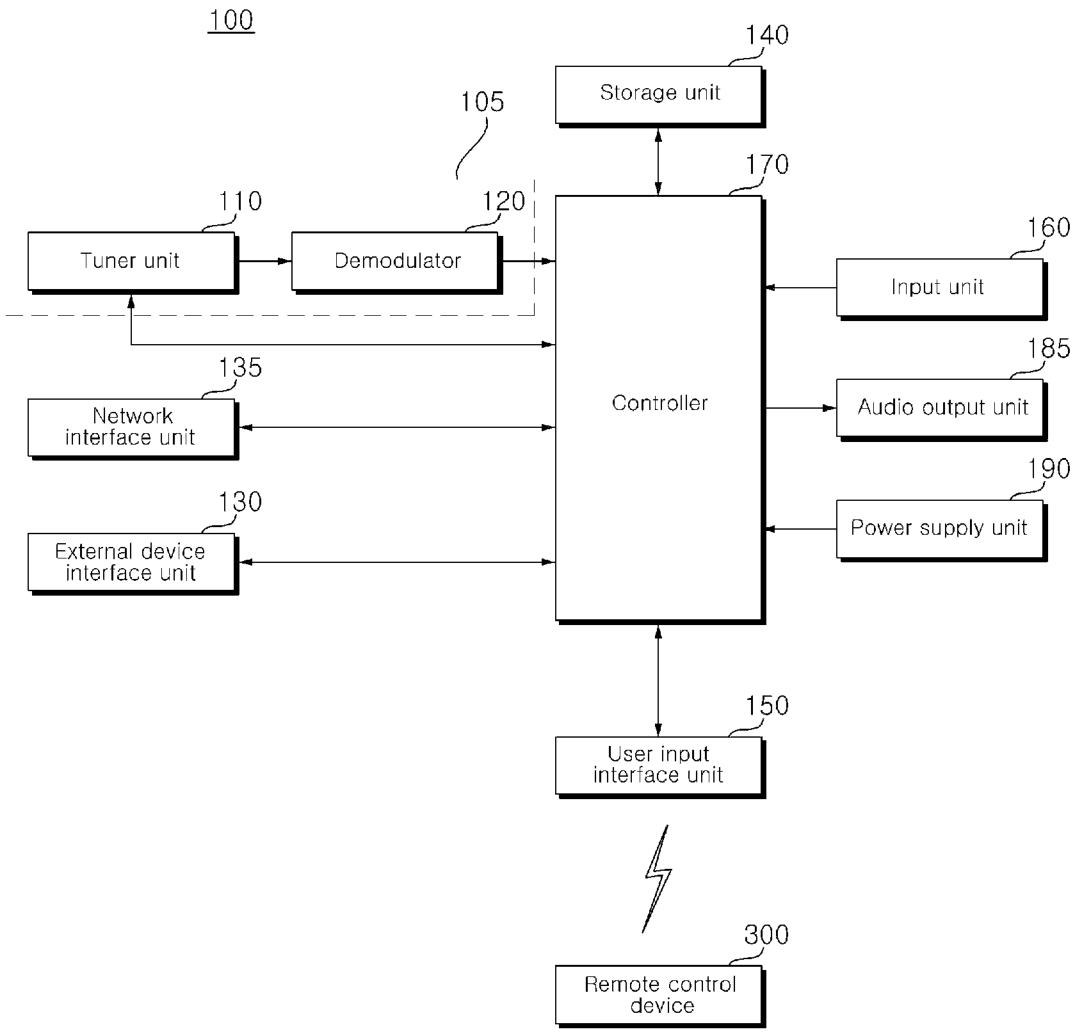
FIG. 2 is an example of an internal block diagram of a control device of FIG. 1.

Next, FIG. 2 is an internal block diagram of the control device of FIG. 1. Referring to FIG. 2, the control device 100 includes a broadcast receiving unit 105, an external device interface unit 130, a network interface unit 135, a storage unit 140, a user input interface unit 150, an input unit 160, a controller 170, an audio output unit 185, and/or a power supply unit 190.

The broadcast receiving unit 105 includes a tuner unit 110 and a demodulator 120. The tuner unit 110 can select a broadcast signal corresponding to a channel selected by a user or all pre-stored channels, among broadcast signals received through an antenna or cable. The tuner unit 110 can also convert the selected broadcast signal into an intermediate frequency signal, a baseband image, or a voice signal.

For example, the tuner unit 110 can convert the selected broadcast signal into a digital IF signal (DIF) when the selected broadcast signal is a digital broadcast signal, and convert the selected broadcast signal into an analog baseband image or voice signal (CVBS/SIF) when the selected broadcast signal is an analog broadcast signal. That is, the tuner unit 110 can process a digital broadcast signal or an analog broadcast signal. The analog baseband image or voice signal (CVBS/SIF) output from the tuner unit 110 may also be directly input to the controller 170.

Further, the tuner unit 110 can sequentially select broadcast signals of all broadcast channels stored through a channel storage function among the received broadcast signals, and convert them into an intermediate frequency signal, a baseband image, or a voice signal. Meanwhile, the tuner unit 110 may include a plurality of tuners in order to receive broadcast signals of a plurality of channels. Alternatively, a single tuner that simultaneously receives broadcast signals of a plurality of channels is also possible.

Further, the demodulator 120 can receive the digital IF signal (DIF) converted by the tuner unit 110 and perform a demodulation operation. The demodulator 120 can also output a stream signal TS after performing demodulation and channel decoding. In this instance, the stream signal may be obtained by multiplexing an image signal, a voice signal, or a data signal.

In addition, the stream signal output from the demodulator 120 can be input to the controller 170. After performing demultiplexing and image/voice signal processing, the controller 170 can transmit the processed signals to the image display apparatus 200 through the external device interface unit 130.

The external device interface unit 130 can transmit or receive data with a connected external device. Also, the external device interface unit 130 may include an A/V input/output unit. The A/V input/output units can transmit and receive signals to and from the external device. For example, the A/V input/output unit may include an Ethernet terminal, a USB terminal, a Composite Video Banking Sync (CVBS) terminal, a component terminal, an S-video terminal (analog), a Digital Visual Interface (DVI) terminal, a High a Definition Multimedia Interface (HDMI) terminal, a Mobile High-definition Link (MHL) terminal, a RGB terminal, a D-SUB terminal, an IEEE 1394 terminal, an SPDIF terminal, a Liquid HD terminal, and the like.

A digital signal input through these terminals can be transmitted to the controller 170. In this instance, the analog signal input through the CVBS terminal and the S-video terminal can be converted into a digital signal through an analog-to-digital converter and transmitted to the controller 170.

Further, the external device interface unit 130 can be connected to the image display apparatus 200 such as a TV or monitor by wire/wirelessly, and perform input/output operation with the image display apparatus 200. The external device interface unit 130 may include a wireless communication unit for short-range wireless communication with other electronic devices.

Through this wireless communication unit, the external device interface unit 130 can exchange data with an adjacent a mobile terminal. For example, the external device interface unit 130 can receive device information, executing application information, application image, and the like from a mobile terminal in a mirroring mode.

In addition, the external device interface unit 130 can perform short-range wireless communication by using Bluetooth, Radio Frequency Identification (RFID), Infrared Data Association (IrDA), Ultra-Wideband (UWB), ZigBee, and the like.

Also, the network interface unit 135 provides an interface for connecting to a wired/wireless network including the Internet network. For example, the network interface unit 155 can receive content or data provided by the Internet or a content provider or network operator, through a network.

The network interface unit 135 may include a communication module for connection with a wired/wireless network. For example, the network interface unit 135 may include a communication module for Wireless LAN (WLAN) (Wi-Fi), Wireless broadband (Wibro), World interoperability for microwave access (Wimax), High Speed Downlink Packet Access (HSDPA), and the like.

The network interface unit 135 can also transmit or receive data with other users or electronic devices, through a connected network or other network linked to the connected network.

In addition, the storage unit 140 can store a program for each signal processing and control in the controller 170, or store a signal-processed image, voice, or data signal. For example, the storage unit 140 can store application programs designed for the purpose of performing various tasks that can be processed by the controller 170, and upon request of the controller 170, selectively provide some of the stored application programs. The program stored in the storage unit 140 is not particularly limited as long as it can be executed by the controller 170.

The storage unit 140 can also temporarily store an image, voice, or data signal received from an external device through the external device interface unit 130. The storage unit 140 can store information on a certain broadcast channel through a channel storage function such as a channel map.

Further, FIG. 2 is a block diagram illustrating an embodiment in which the storage unit 140 is provided separately from the controller 170, but the scope of the present disclosure is not limited thereto, and the storage unit 140 may be included in the controller 170.

In addition, the storage unit 140 may include at least one of a volatile memory (e.g. DRAM, SRAM, SDRAM, etc.), a non-volatile memory (e.g. a flash memory, a hard disk drive (HDD), or a solid state drive (SSD), etc.). In various embodiments of the present disclosure, the storage unit 140 and the memory may be used interchangeably.

Further, the user input interface unit 150 can transmit a signal input by a user to the controller 170, or transmit a signal from the controller 170 to a user. For example, the user input interface unit 150 can transmit/receive a user input signal such as power on/off, channel selection, and screen setting from the remote control device 400, transmit a user input signal input from a local key such as a power key, a channel key, a volume key, and a setting value to the controller 170, transmit a user input signal input from a sensor unit that senses a user's gesture to the controller 170, or transmit a signal from the controller 170 to the sensor unit.

In addition, the input unit 160 can be provided in one side of the main body of the control device 100. For example, the input unit 160 may include a touch pad, a physical button, and the like. The input unit 160 can receive various user commands related to the operation of the control device 100, and transmit a control signal corresponding to the input command to the controller 170. The input unit 160 can also transmit a control signal corresponding to an input command to the controller 170 through the user input interface unit 150. The input unit 160 may include at least one microphone and receive a voice through the microphone.

Further, the controller 170 may include at least one processor, and control the overall operation of the control device 100 by using the processor included therein. Here, the processor may be a general processor such as a central processing unit (CPU). The processor can also be a dedicated device such as an ASIC or other hardware-based processor.

In addition, the controller 170 can generate and output a signal for an image or voice output by demultiplexing a stream input through the tuner unit 110, the demodulator 120, the external device interface unit 130, or the network interface unit 135, or processing the demultiplexed signals. The image signal and/or voice signal processed by the controller 170 can be transmitted to the image display apparatus 200 through the external device interface unit 130.

Further, the voice signal processed by the controller 170 can be transmitted to the audio output unit 185. The audio output unit 185 may include at least one speaker The audio output unit 185 can also receive the voice signal processed by the controller 170 and output it as a voice.

Further, the controller 170 may include a demultiplexer, an image processor, and the like. In addition, the controller 170 controls overall operations within the control device 100. For example, the controller 170 can control the tuner unit 110 to tune a broadcast corresponding to a channel selected by a user or a pre-stored channel.

The control device 100 may further include a photographing unit. The photographing unit may photograph a user. The photographing unit may be implemented with one camera, but is not limited thereto, and may be implemented with a plurality of cameras. Meanwhile, the photographing unit may be embedded in an upper portion of the control device 100 or disposed separately. Image information photographed by the photographing unit can be input to the controller 170.

In addition, the controller 170 can recognize the location of a user, based on the image photographed by the photographing unit. For example, the controller 170 can determine the distance (z-axis coordinate) between a user and the control device 100. The controller 170 can also detect a user's gesture, based on an image photographed by the photographing unit or each detected signal from the sensor unit, or a combination thereof.

Further, the power supply unit 190 can supply corresponding power throughout the control device 100. In particular, power may be supplied to the controller 170 which can be implemented in the form of a system on chip (SOC), the audio output unit 185 for audio output, and the like. Specifically, the power supply unit 190 may include a converter that converts AC power into DC power, and a DC/Dc converter that converts the level of DC power.

In addition, the remote control device 400 can transmit a user input to the user input interface unit 150. The remote control device 400 may use Bluetooth, Radio Frequency (RF) communication, Infrared Radiation (IR) communication, Ultra-wideband (UWB), ZigBee, or the like. In addition, the remote control device 400 can receive an image, voice, or data signal output from the user input interface unit 150, and display it on the remote control device 400 or output it as a voce.

Further, the block diagram of the control device 100 shown in FIG. 2 illustrates an embodiment of the present disclosure, and each component of the block diagram can be integrated, added, or omitted according to the specification of the control device 100 actually implemented. That is, two or more components can be combined into a single component, or a single component can be subdivided into two or more components. In addition, functions performed in each block are for explaining an embodiment of the present disclosure, and the specific operation or device does not limit the scope of the present disclosure.

Figure 3A:
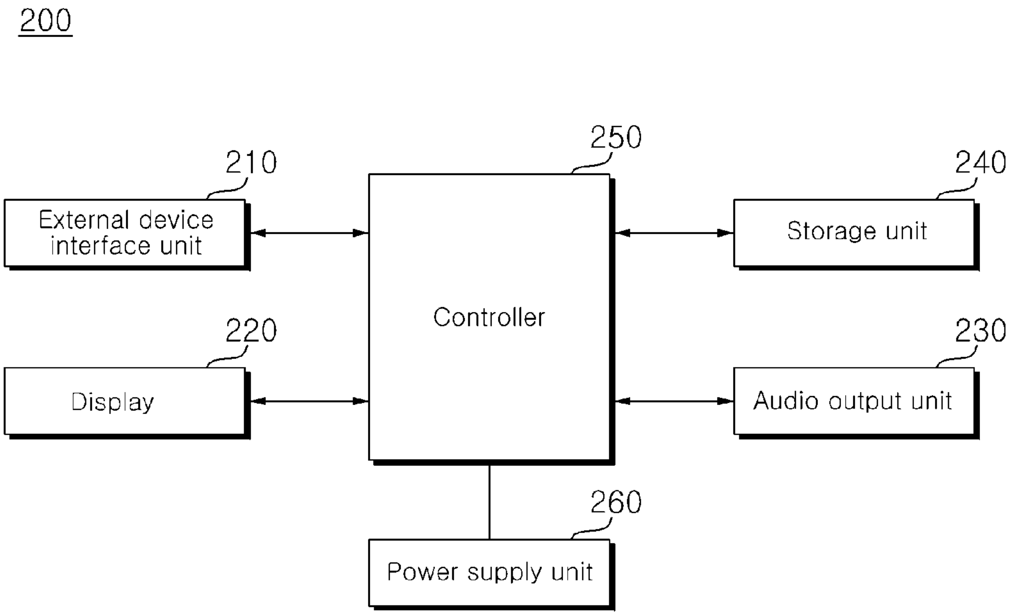
FIG. 3A is an example of an internal block diagram of an image display apparatus of FIG. 1.
Figure 3B:
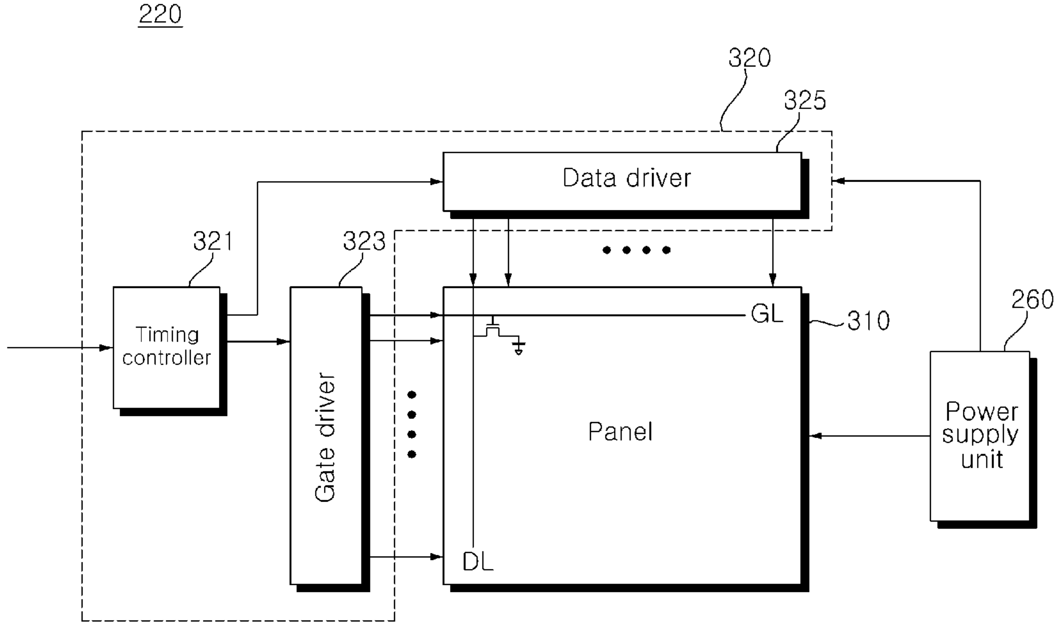
FIG. 3B is an example of an internal block diagram of a display of FIG. 3A.

Next, FIG. 3A is an example of an internal block diagram of the image display apparatus of FIG. 1, and FIG. 3B is an example of an internal block diagram of the display of FIG. 3A. Referring to FIG. 3A, the image display apparatus 200 includes an external device interface unit 210, a display 220, an audio output unit 230, a storage unit 240, and/or a controller 250.

The external device interface unit 210 can transmit/receive a signal including data with a connected external device. For example, the external device interface unit 210 can be connected to the control device 100 by wire, and receive a signal from the control device 100. The external device interface unit 210 can also receive an image signal and/or voice signal from the control device 100, and receive a control signal.

Further, the display 220 can generate a driving signal by converting an image signal, data signal, OSD signal, control signal processed by the controller 250, or an image signal, data signal, control signal, etc. received from the control device 100 through the external device interface unit 210. This will be described with reference to FIG. 3B.

Referring to FIG. 3B, the display 220 includes a display panel 310 and a panel driving unit 320. The display panel 310 includes a plurality of pixels connected to gate lines GL and data lines DL intersecting each other in a matrix form. Thin film transistors TFTs are also disposed at an intersection portion of the gate lines GL and data lines DL.

In addition, the pixels included in the display panel 310 may include a RGB sub-pixel. Alternatively, the pixels included in the display panel 310 may include a RGBW sub-pixel. Further, the display 220 can generate a driving signal for a plurality of pixels by converting an image signal, data signal, OSD signal, control signal processed by the controller 250, or an image signal, data signal, control signal, or the like received from the control device 100 through the external device interface unit 210. Hereinafter, for convenience of explanation, it will be described that components included in the display 200 operate according to a signal transmitted from the controller 250.

In addition, the panel driving unit 320 can drive the display panel 310, based on a control signal and a data signal transmitted from the controller 250. In FIG. 3B, the panel driving unit 320 includes a timing controller 321, a gate driver 323, and/or a data driver 325.

The timing controller 321 can receive a control signal, an image signal, and the like from the controller 250. The timing controller 321 can control the gate driver 323 and/or the data driver 325 in response to a control signal. The timing controller 321 can also re-dispose an image signal according to the specifications of the data driver 325, and transmit it to the data driver 325.

Further, the gate driver 323 and the data driver 325 can supply a scan signal and an image signal to the display panel 310 through the gate line GL and the data line DL, under the control of the timing controller 321. Meanwhile, the data driver 325 may include a plurality of source driver integrated circuits ICs corresponding to the plurality of data lines DL.

In addition, the display 220 may be a flexible display including an organic light emitting panel composed of an organic light emitting diode OLED. The display panel 310 may also be formed on a substrate made of a material having flexibility such as polyimide. When the display panel 310 is an organic light emitting display panel including organic light emitting diodes OLEDs, a plurality of pixels can be formed of organic light emitting diodes OLEDs.

In addition, the display 220 may be capable of performing a 3D display. The display 220 capable of performing a 3D display may be divided into a non-glasses type and a glasses type. Meanwhile, the display 220 may be configured as a touch screen and can be used as an input device in addition to an output device.

A power supply unit 260 can supply corresponding power throughout the image processing apparatus 200. In particular, the power supply unit 260 can supply power to the controller 250 which can be implemented in the form of a system on chip SOC, the display 220 for displaying images, and the audio output unit 230 for outputting audio. Specifically, the power supply unit 260 may include a converter that converts AC power into DC power and a DC/Dc converter that converts the level of DC power. The power supply unit 260 can supply a common electrode voltage Vcom to the display panel 310, and supply a gamma voltage to the data driver 325.

Referring back to FIG. 3A, the audio output unit 230 can receive a voice signal transmitted from the control device 100 through the external device interface unit 210 and output it as a voice. The audio output unit 230 may include at least one speaker.

In addition, the audio output unit 230 may include at least one vibration generator including an exciter that vibrates the display panel 310 included in the display 220. The vibration generator may be mounted on the display panel 310 of the display 220 and vibrate the display panel 310 in response to a voice signal.

For example, the vibration generator can be mounted on the rear surface of the display panel 310, and vibrate the display panel 310 so that a voice is output to the front of the display panel 310 where a user is located. A plurality of vibration generators can also be mounted on the display panel 310.

The plurality of vibration generators can independently vibrate an area where each vibration generator is disposed. For example, a first vibration generator can be attached to the lower area of the display panel 310 to vibrate the lower area of the display panel 310 so that high-pitched sound and low-pitched sound are simultaneously generated, and a second vibration generator can be attached to the upper area of the display panel 310 to vibrate the upper area of the display panel 310 so that high-pitched sound is generated.

In addition, the storage unit 240 can store a program for processing and controlling each signal in the controller 250, or store signal-processed image, voice, or data signal. For example, the storage unit 240 can store application programs designed to perform various tasks that can be processed by the controller 250, and upon request of the controller 250, can selectively provide some of the stored application programs. A program or the like stored in the storage unit 240 is not particularly limited as long as it can be executed by the controller 250.

The controller 250 can include at least one processor, and can control the overall operation of the image display apparatus 200 by the at least one processor. Here, the processor may be a general processor such as a central processing unit CPU. The processor may also be a dedicated device such as an ASIC or other hardware-based processor.

According to various embodiments, the image display apparatus 200 may not include the storage unit 240 and/or the controller 250. For example, the image display apparatus 200 can operate according to a control signal received from the control device 100, or output an image signal received from the control device 100 through the display 200 intactly, or output a voice signal intactly through the audio output unit 230. The controller 250 may include a demultiplexer, an image processor, a mixer, a frame rate converter, a formatter, an audio processor, a data processor, and the like.

In addition, the controller 250 can check the state of the display panel 310 and based on a result of checking the state of the display panel 310, perform afterimage compensation for the display panel 310. For example, the controller 250 can perform afterimage compensation for the display panel 310 according to a control signal received from the control device 100, a user input, and/or a preset time interval. Here, the preset time interval may refer to a time interval between a point in time when a previous afterimage compensation is completed and a point in time when a next afterimage compensation is automatically started.

Figure 4:
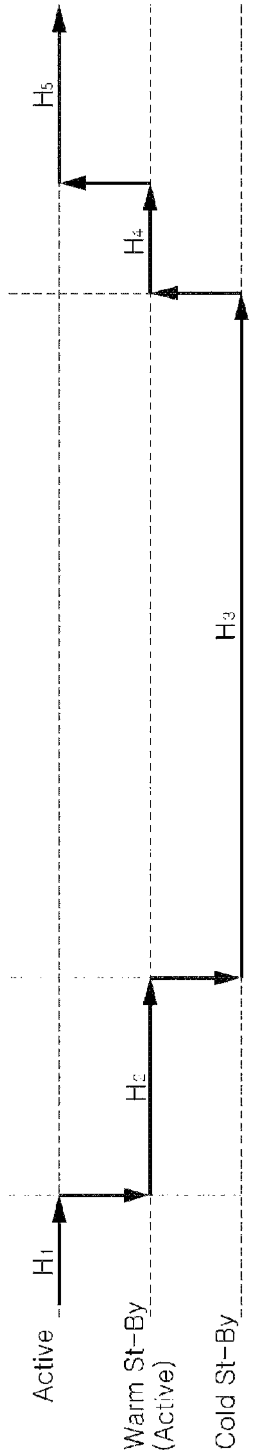
FIGS. 4 to 6 are diagrams for explaining a compensation for afterimage on a display panel.

Next, FIG. 4 illustrates an order in which the image display apparatus 200 performs afterimage compensation for the display panel 310. as shown, the image display apparatus 200 can output an image through the display 220 by supplying power to the display panel 310, in a H1 section. The image display apparatus 200 can then perform a first afterimage compensation for the display panel 310, regardless of the temperature of the display panel 310, in a H2 section.

The image display apparatus 200 can wait for a certain time so that the temperature of the display panel 310 is decreased, in a H3 section. The image display apparatus 200 can then perform a second afterimage compensation for the display panel 310, when a certain time has elapsed, in a H4 section. This will be described in more detail with reference to FIG. 6.

After performing the first and second afterimage compensations for the display panel 310, the image display apparatus 200 can supply power to the display panel 310 to output an image through the display 220, in a H5 section, which will be described in detail with reference to FIGS. 5 and 6.

Figure 5:
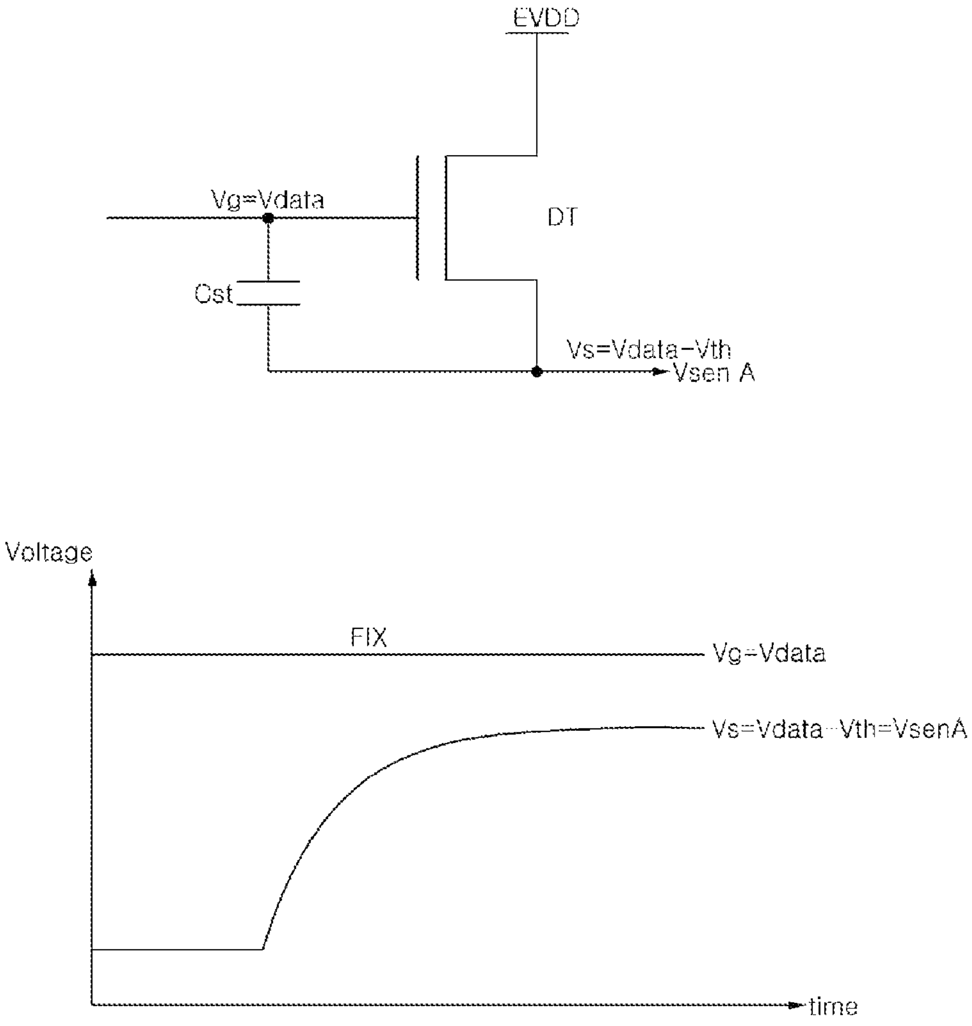

Referring to FIG. 5, the image display apparatus 200 can operate the thin film transistor DT, which is a driving element of the display panel 310, in a source follower method, and then detect a source voltage Vs of the thin film transistor DT as a sensing voltage VsenA. In addition, a threshold voltage Vth can be calculated based on the level of the sensing voltage VsenA, an offset value for compensating the amount of change in the threshold voltage of the thin film transistor DT can be determined, and the offset value can be added to data of an input image to compensate the amount of change in the threshold voltage of the thin film transistor DT.

In this instance, the sensing voltage VsenA can be detected after a gate-source voltage Vgs of the thin film transistor DT reaches a saturation state. When the gate-source voltage Vgs of the thin film transistor DT is in a saturation state, a drain-source current of the thin film transistor DT may be zero.

Figure 6:
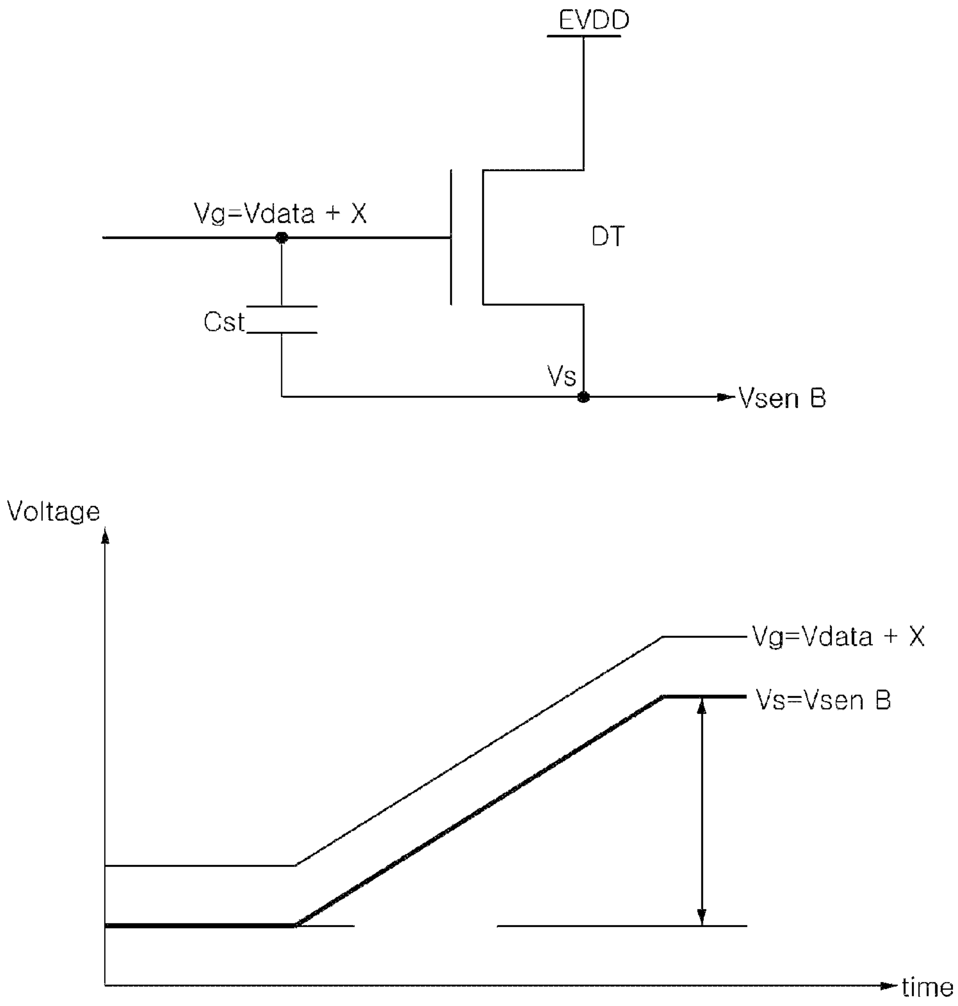

Referring to FIG. 6, the image display apparatus 200 can apply a voltage (Vdata+X, where X is a voltage according to an offset value compensation) higher than the threshold voltage Vth of the thin film transistor DT to the gate of the thin film transistor DT, so that the thin film transistor DT can be turned on, and the source voltage Vs of the thin film transistor DT charged for a certain time can be detected as the sensing voltage VsenB.

The image display apparatus 200 can calculate the amount of change in mobility of the thin film transistor DT according to the magnitude of the sensing voltage Vsen B, and based on the amount of change in mobility, can determine a gain value for data compensation. In this instance, as the data of the input image is multiplied by the gain value, the change in mobility of the thin film transistor DT can be compensated.

When the temperature of the display panel 310 is not sufficiently low, as the temperature of the display panel 310 becomes higher, the gain value determined based on the amount of change in mobility may decrease, and as the gain value becomes smaller, the compensation rate of each pixel can be lowered.

In addition, the controller 250 can check the result of performing the afterimage compensation, and determine whether the result of performing the afterimage compensation satisfies a certain reference. The controller 250 can check the number of pixels in which the offset value for compensating for the amount of change in threshold voltage is determined to be equal to or greater than a preset reference offset value, among the pixels provided in the display panel 310. Here, the reference offset value may be determined in response to the amount of change in threshold voltage at which afterimages occur due to deterioration of the thin film transistor DT and the organic light emitting diode OLED.

The controller 250 can also check the number of pixels in which a gain value for data compensation according to the amount of change in mobility is determined to be equal to or greater than a preset reference gain value, among pixels provided in the display panel 310. Here, the reference gain value can be determined in response to the amount of change in mobility at which afterimages occur due to deterioration of the thin film transistor DT and the organic light emitting diode OLED.

When the number of pixels determined to be equal to or greater than the reference offset value is equal to or greater than a certain first number and when the number of pixels determined to be equal to or greater than the reference gain value is equal to or greater than a certain second number, the controller 250 can determine that the result of performing the afterimage compensation satisfies a certain reference, and transmit a signal including data for a result of performing the afterimage compensation to the control device 100 through the external device interface unit 210. Here, the first number and the second number may be the same or different, and may be set variously according to embodiments.

In addition, when the result of performing the afterimage compensation satisfies a certain reference, the controller 250 can transmit a signal including data for the result of performing the afterimage compensation to the control device 100 through the external device interface unit 210. Here, the data for the result of performing the afterimage compensation may include a time when the image is output through the display 220 from a time point at which the previous afterimage compensation was completed, an area (hereinafter, a first area) of an image including pixels determined to be equal to or greater than the reference offset value, an area (hereinafter, a second area) of the image including pixels determined to be equal to or greater than the reference gain value, and the like.

The controller 250 can perform afterimage compensation for the display panel 310, when a control signal for instructing performance of the afterimage compensation is received from the control device 100. In addition, the control signal for instructing performance of the afterimage compensation may include a time when the image was output from a time point at which the previous afterimage compensation was completed in the other image display apparatus, a first area related to the offset value, a second area related to the gain value, and the like.

For example, when a control signal for instructing performance of afterimage compensation is received from the control device 100, the controller 250 can check the ratio of the time when an image is output through the display 220 and the time when an image is output from the other image display apparatus. When the checked ratio is a certain ratio (e.g., 80%) or more, the controller 250 can perform afterimage compensation for the display panel 310.

For example, when a control signal for instructing performance of afterimage compensation is received from the control device 100, the controller 250 can check a ratio of a preset time interval in relation to performing afterimage compensation and a time when an image is output through the display 220. When the checked ratio is a certain ratio (e.g. 50%) or more, the controller 250 can perform afterimage compensation for the display panel 310.

The controller 250 can also perform afterimage compensation for the display panel 310, based on the first area related to the offset value and/or the second area related to the gain value that are included in the control signal received from the control device 100. For example, the controller 250 can check an area corresponding to the first area related to the offset value and/or the second area related to the gain value, which are included in the control signal, among the entire area of the display panel 310, and perform afterimage compensation for a corresponding area.

Figure 7:
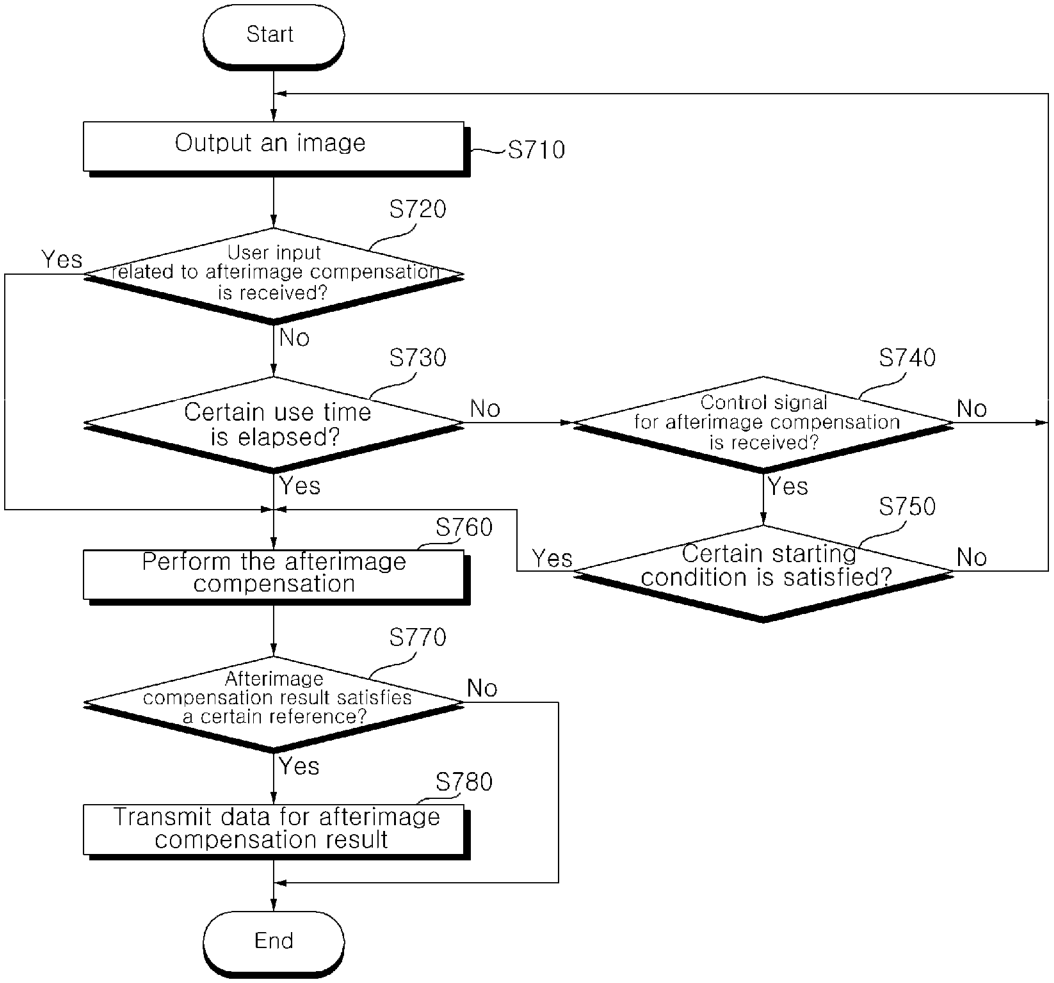
FIG. 7 is a flowchart of a method of operating an image display apparatus according to an embodiment of the present disclosure.

Next, FIG. 7 is a flowchart of a method of operating an image display apparatus according to an embodiment of the present disclosure. Referring to FIG. 7, the image display apparatus 200 outputs an image corresponding to an image signal received from the control device 200 through the display 220, at operation S710.

The image display apparatus 200 checks whether a user input related to the performance of afterimage compensation is received, at operation S720. For example, the image display apparatus 100 can check whether a signal corresponding to a user input related to the performance of afterimage compensation is received from the remote control device 400.

At operation S730, if a user input related to the performance of afterimage compensation is not received (No in operation S730), the image display apparatus 200 can check whether a certain use time is elapsed from a time point at which the performance of previous afterimage compensation was completed. For example, the image display apparatus 200 can check whether the time when the image is output through the display 220 from a time point at which the previous afterimage compensation is completed has reached a use time corresponding to a preset time interval.

At operation S740, when a certain use time is not elapsed (No in operation S730), the image display apparatus 200 can check whether a control signal for instructing the performance of the afterimage compensation is received from the control device 100. After the performance of previous afterimage compensation was completed, the image display apparatus 200 can also check whether there is a history of receiving a control signal for instructing the performance of the afterimage compensation from the control device 100.

At operation S750, when a control signal for instructing the performance of the afterimage compensation is received from the control device 100 (Yes in operation S740), the image display apparatus 200 can determine whether a certain condition (hereinafter, starting condition) related to the start of afterimage compensation is satisfied. For example, the image display apparatus 200 can check the ratio of the time when an image is output through the display 220 and the time when an image is output from the other image display apparatus, and when the checked ratio is a certain ratio (e.g. 80%) or more, may determine that the starting condition is satisfied. For example, the image display apparatus 200 can check a ratio of a preset time interval in relation to the performance of afterimage compensation and a time when an image is output through the display 220, and when the checked ratio is a certain ratio (e.g. 50%) or more, determine that the starting condition is satisfied.

When a control signal for instructing the performance of afterimage compensation is not received from the control device 100 (No in operation S740), or when the starting condition is not satisfied (No in operation S750), the image display apparatus 200 can branch to operation S710, and continuously output an image corresponding to the image signal received from the control device 200.

In addition, at operation S760, when a user input related to the performance of afterimage compensation is received (Yes in operation S720), when a certain use time is elapsed (Yes in operation S730), or when a starting condition is satisfied (Yes in operation S750), the image display apparatus 200 can perform the afterimage compensation for the display panel 310.

The image display apparatus 200 can determine whether the result of performing the afterimage compensation satisfies a certain reference, at operation S770. For example, when at least one of the number of pixels determined to be equal to or greater than the reference offset value is greater than or equal to a certain first number and when the number of pixels determined to be equal to or greater than the reference gain value is greater than or equal to a certain second number, the image display apparatus 200 can determine that the result of performing the afterimage compensation satisfies a certain reference.

At operation S780, when the result of performing the afterimage compensation satisfies a certain reference (Yes in operation S770), the image display apparatus 200 can transmit a signal including data for a result of performing the afterimage compensation to the controller 100. When the result of performing the afterimage compensation does not satisfy the certain reference (No in operation S770), the image display apparatus 200 can end the method.

Figure 8:
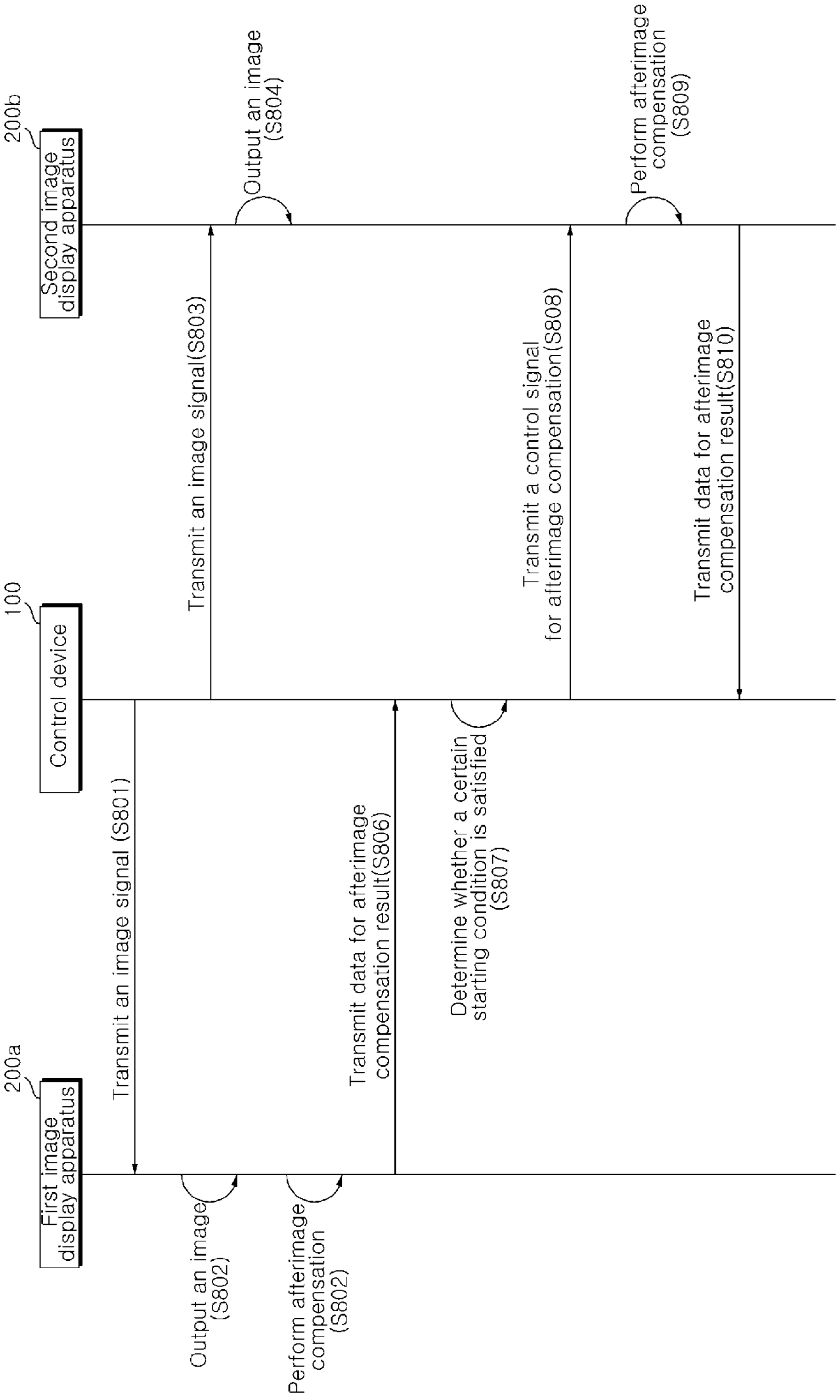
FIG. 8 is a flowchart of a method of operating a system according to an embodiment of the present disclosure.

Next, FIG. 8 is a flowchart of a method of operating a system according to an embodiment of the present disclosure. Detailed descriptions of contents overlapping those described in FIG. 7 will be omitted. Referring to FIG. 8, the control device 100 can transmit an image signal to a first image display apparatus 200*a*, at operation S801, and the first image display apparatus 200*a* may output an image corresponding to the image signal received from the control device 100, at operation S802.

The control device 100 may transmit an image signal to a second image display apparatus 200*b*, at operation S803, and the second image display apparatus 200*b* can output an image corresponding to the image signal received from the control device 100, at operation S804. In this instance, an image corresponding to the image signal transmitted to the first image display apparatus 200*a* and an image corresponding to the image signal transmitted to the second image display apparatus 200*b* may be the same image.

At operation S805, when a user input related to performance of the afterimage compensation is received, or when a certain use time is elapsed, the first image display apparatus 200*a* can perform afterimage compensation for the display panel 310 (hereinafter, a first display panel) provided in the first image display apparatus 200*a*.

At operation S806, when the result of performing the afterimage compensation satisfies a certain reference, the first image display apparatus 200*a* can transmit a signal including data for a result of performing the afterimage compensation to the controller 100.

At operation S807, when a signal including data for a result of performing afterimage compensation is received from the first image display apparatus 200*a*, the control device 100 can determine whether a starting condition related to the afterimage compensation of the second image display apparatus 200*b* is satisfied.

For example, the control device 100 can check the ratio of a time (hereinafter, a first time) when the first image display apparatus 200*a* outputs an image from the time point at which the previous afterimage compensation is completed and a time (hereinafter, a second time) when the second image display apparatus 200*b* outputs an image from the time point at which the previous afterimage compensation is completed, and if the checked ratio is a certain ratio (e.g. 80%) or more, can determine that the starting condition related to the afterimage compensation of the second image display apparatus 200*b* is satisfied.

In another example, the control device 100 can check the ratio of a preset time interval in relation to the performance of the afterimage compensation and a second time, and if the checked ratio is a certain ratio (e.g. 50%) or more, may determine that the starting condition is satisfied. The control device 100 can monitor the time when an image is output from the time point at which afterimage compensation is completed in each of the image display apparatuses 200*a* and 200*b*.

At operation S808, when the starting condition related to the afterimage compensation of the second image display apparatus 200*b* is satisfied, the control device 100 can transmit a control signal for instructing performance of afterimage compensation to the second image display device 200*b*.

At operation S809, when a control signal for instructing performance of the afterimage compensation is received from the control device 100, the second image display apparatus 200*b* can perform afterimage compensation for the display panel 310 (hereinafter, a second display panel) provided in the second image display apparatus 200*b*.

The second image display apparatus 200*b* can perform the afterimage compensation for the second display panel, based on the first area related to the offset value and/or the second area related to the gain value that are included in the control signal received from the control device 100. For example, the second image display apparatus 200*b* can check an area corresponding to the first area related to the offset value and/or the second area related to the gain value included in the control signal, among the entire area of the second display panel, and perform afterimage compensation for a corresponding area.

After determining whether the starting condition related to the afterimage compensation is satisfied, the second image display apparatus 200*b* can perform the afterimage compensation, or perform afterimage compensation immediately when a control signal for instructing performance of afterimage compensation is received from the control device 100. That is, as the control device 100 determines whether the starting condition related to the afterimage compensation of the second image display apparatus 200*b* is satisfied, the second image display apparatus 200*b* can omit determining whether the starting condition related to the afterimage compensation is satisfied.

At operation S810, when the result of performing the afterimage compensation satisfies a certain reference, the second image display apparatus 200*b* can transmit a signal including data for a result of performing the afterimage compensation to the control device 100.

As described above, according to various embodiments of the present disclosure, when the plurality of image display apparatuses 200*a* and 200*b* output the same/similar images, as a result of performing the afterimage compensation of the first image display apparatus 200*a*, if the degree of deterioration of the driving element or the organic light emitting diode of the first image display apparatus 200*a* exceeds a certain reference, the second image display apparatus 200*b* can also start to perform an operation for afterimage compensation according to a certain condition, even without a user input or a lapse of a preset time.

Further, according to various embodiments of the present disclosure, a result of performing an operation for afterimage compensation by the first image display apparatus 200*a* can be used to perform an operation for afterimage compensation performed in the second image display apparatus 200*b*, thereby completing afterimage compensation of the second image display apparatus 200*b* more accurately and quickly.

The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

Meanwhile, the operating method of the image display apparatus and/or the control device of the present disclosure can be implemented as a processor-readable code in a processor-readable recording medium provided in the image display apparatus and/or the control device. The processor-readable recording medium includes all kinds of recording apparatuses storing data that can be read by a processor. Examples of the processor-readable recording medium is ROM, RAM, CD-ROM, magnetic tapes, floppy disks, optical data storage apparatuses, and, including those that are implemented in the form of carrier waves such as data transmission through the Internet. In addition, the processor-readable recording medium is dispersed in computer systems connected through a network, so that the processor-readable code can be stored and executed in a distributed fashion.

In addition, although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

The invention claimed is:

1. A system comprising:

a plurality of image display apparatuses including at least a first image display apparatus and a second image display apparatus; and a control device controlling the first image display apparatus and the second image display apparatus, wherein the control device:

controls the first image display apparatus to display a first image, controls the second image display apparatus to display a second image, controls the first image display apparatus to perform an afterimage compensation for pixels included in a first display panel in the first image display apparatus, receives, from the first image display apparatus, data results of the afterimage compensation for pixels included in the first display panel, and controls the second image display apparatus to perform an afterimage compensation for pixels included in a second display panel in the second image display apparatus, based on the received data results of the afterimage compensation performed for the pixels included in the first display panel in the first image display apparatus, and wherein the first image display apparatus:

calculates a threshold voltage for each pixel included in the first display panel, determines an offset value corresponding to an amount of change in the threshold voltage, calculates an electron mobility for each pixel included in the first display panel, determines a gain value corresponding to the calculated electron mobility, and performs the afterimage compensation for the pixels included in the first display panel, based on at least one of the determined offset value and gain value.

2. The system of claim 1, wherein the first image displayed by the first image display apparatus and the second image displayed by the second image display apparatus are the same images.

3. The system of claim 2, wherein the first image display apparatus determines whether a result of performing the afterimage compensation satisfies a predetermined reference, based on at least one of the determined offset value and gain value.

4. The system of claim 3, wherein the first image display apparatus determines that the result of performing the afterimage compensation satisfies the predetermined reference when a number of pixels having the determined offset value equal to or greater than a reference offset value is greater than or equal to a first number, and when a number of pixels having the determined gain value equal to or greater than a reference gain value is greater than or equal to a second number.

5. The system of claim 4, wherein the control device:

checks a ratio of a time when the first image is displayed through the first display panel and a time when the second image is displayed through the second display panel, when the data results of the afterimage compensation performed for the pixels included in the first display panel is received from the first image display apparatus, and transmits a control signal to the second image display apparatus to control the second image display apparatus to perform the afterimage compensation for the pixels included in the second display panel, when the checked ratio is a predetermined reference ratio or more.

6. The system of claim 4, wherein the control signal comprises data for a time when the first image is displayed through the first display panel of the first image display apparatus, and wherein the second image display apparatus:

checks a ratio of a time when the first image is displayed through the first display panel and a time when the second image is displayed through the second display panel, when the control signal is received from the control device, and performs the afterimage compensation for the pixels included in the second display panel when the checked ratio exceeds a predetermined reference ratio.

7. An image display apparatus comprising:

a display including a display panel;

an external device interface configured to transmit and receive a signal to and from a control device controlling the image display apparatus and at least one other image display apparatus; and a controller configured to:

display an image on the display corresponding to an image signal received from the control device, calculate a threshold voltage for each pixel included in the display panel, determine an offset value corresponding to an amount of change in the threshold voltage, calculate an electron mobility for each pixel included in the display panel, determine a gain value corresponding to the calculated electron mobility, and perform an afterimage compensation for pixels included in the display panel, based on at least one of the determined offset value and gain value, determine whether a result of performing the afterimage compensation for the pixels included in the display panel satisfies a predetermined reference, and transmit a signal including data indicating a result of performing the afterimage compensation to the control device through the external device interface unit, when the result of performing the afterimage compensation satisfies the predetermined reference.

8. The image display apparatus of claim 7, wherein the controller is further configured to determine whether the result of performing the afterimage compensation satisfies the predetermined reference, based on at least one of the determined offset value and gain value.

9. The image display apparatus of claim 8, wherein the controller is further configured to determine the result of performing the afterimage compensation satisfies the predetermined reference, when at least one of a number of pixels having the determined offset value equal to or greater than a reference offset value is greater than or equal to a first number, and a when a number of pixels having the determined gain value equal to or greater than a reference gain value is greater than or equal to a second number.

10. The image display apparatus of claim 9, wherein the controller is further configured to perform the afterimage compensation for the pixels included in the display panel, when a control signal for instructing the performance of the afterimage compensation is received from the control device.

11. The image display apparatus of claim 10, wherein the control signal comprises data for a time when the image is displayed through the other image display apparatus, wherein the controller is further configured to:

check a ratio of a time when the image is output through the other image display apparatus and a time when the image is displayed through the display panel, when the control signal is received from the control device, and perform the afterimage compensation for the pixels included in the display panel when the checked ratio is a predetermined reference ratio.

12. The image display apparatus of claim 10, wherein the image displayed through the image display apparatus is the same as the image displayed through the other image display apparatus.

13. A control device for controlling at least a first image display apparatus and a second image display apparatus, the control device comprising:

an external device interface configured to transmit and receive a signal to and from the first image display apparatus and the second image display apparatus; and a controller configured to:

control the first image display apparatus to display a first image, control the second image display apparatus to display a second image, control the first image display apparatus to perform an afterimage compensation for pixels included in a first display panel in the first image display apparatus, receive, from the first image display apparatus, data results of the afterimage compensation for pixels included in the first display panel, check a ratio of a time when the first image is displayed through the first display panel and a time when the second image is displayed through the second display panel, when the data results of the afterimage compensation performed for the pixels included in the first display panel is received from the first image display apparatus, and transmit, when the checked ratio is a predetermined reference ratio or more, a control signal to the second image display apparatus to control the second image display apparatus to perform an afterimage compensation for pixels included in a second display panel in the second image display apparatus, based on the received data results of the afterimage compensation performed for the pixels included in the first display panel in the first image display apparatus.

14. The control device of claim 13, wherein the first image displayed by the first image display apparatus and the second image displayed by the second image display apparatus are the same images.

15. The control device of claim 13, further comprising:

a remote controller interface configured to receive a remote control signal.

16. The control device of claim 15, wherein the controller controls the first image display apparatus to perform the afterimage compensation for the pixels included in the first display panel, in response to receiving the remote control signal requesting the control device control the first image display apparatus to perform the afterimage compensation for the pixels included in the first display panel.

17. The control device of claim 13, wherein the controller controls the first image display apparatus to perform the afterimage compensation for the pixels included in the first display panel in response to the first display panel being used greater than a predetermined amount of time.

* * * * *